United States Patent [19]
Kou

[11] Patent Number: 6,016,491
[45] Date of Patent: Jan. 18, 2000

[54] GENERIC FILE FORMAT FOR MULTIPLE SECURITY REQUIREMENTS

[75] Inventor: Weidong Kou, Scarborough, Canada

[73] Assignee: International Business Machines Corporation, Armonk, N.Y.

[21] Appl. No.: 08/781,465

[22] Filed: Jan. 7, 1997

[30] Foreign Application Priority Data

Jul. 29, 1996 [CA] Canada .................................. 2182254

[51] Int. Cl.[7] .............................. G06F 17/30; H04L 9/00
[52] U.S. Cl. ................................................ 707/9; 707/101
[58] Field of Search ................................ 707/9; 380/3, 4; 395/186, 187.01, 188.01

[56] References Cited

U.S. PATENT DOCUMENTS

| | | | |
|---|---|---|---|
| 5,132,900 | 7/1992 | Gilchrist et al. | 707/9 |
| 5,369,702 | 11/1994 | Shanton | 380/4 |
| 5,584,023 | 12/1996 | Hsu | 707/204 |
| 5,638,443 | 6/1997 | Stefik et al. | 380/4 |
| 5,680,452 | 10/1997 | Shanton | 380/4 |

*Primary Examiner*—Wayne Amsbury
*Assistant Examiner*—John C. Loomis
*Attorney, Agent, or Firm*—Jeanine S. Ray-Yarletts

[57] ABSTRACT

A generic secure file format to solve problems associated with secure storage and interchange. The file format allows multiple files to be wrapped into a single entity for storage or transmission interchange. Each file can have different security requirements from that of other files. Different file types can be interchanged under a single wrapper in this secure file format. The secure file format also allows one file to be divided into multiple sections and wraps them into a single file. Each section of the file has its own security protection. This enables only sensitive information to be protected, and leaves other sections with less or no security protection. This results in higher performance since security related operations are only required for a small portion of the file.

19 Claims, 9 Drawing Sheets

| |
|---|
| 1<br><br>ADDRESS |
| 2<br><br>PRICE/QUANTITY |
| 3<br><br>DELIVERY DATES |
| 4<br><br>CONDITIONS |
| 5<br><br>CONDITIONS |
| 6<br><br>DIGITAL SIGNATURE |

FIG. 1
(prior art)

| 36 |
| :---: |
| ADDRESS |

| 38 |
| :---: |
| GSFF |

FIG. 7

GENERIC FILE FORMAT FOR MULTIPLE SECURITY REQUIREMENTS

FIELD OF THE INVENTION

This invention relates to the field of electronic data transfer and provides a file structure permitting the secure bundling, for storage or transmission, of multiple data components having different security requirements. Any attempt to tamper with the file structure will be immediately apparent on opening the compromised component.

BACKGROUND OF THE INVENTION

The electronic storage and transmission of information is being used increasingly for commercial transactions. Commercial information is particularly complex because it may include data input from different sources which must be kept together in order to have a meaningful document or series of documents. Also, some of this data may be highly sensitive information, such as financial data, coupled with other information of lesser or no sensitivity.

Electronic information of this type may be maintained in different ways, for example, in the form of a single electronic file having multiple sections or data fields (a compound file), as multiple separate electronic files or documents, or in a combination of compound electronic files. It may be required that these files be stored in a computer system, or interchanged between two users over the same computer system or over a network of different systems.

Depending on the level of sensitivity, different portions of the electronic information may require different forms of security protection to prevent unauthorized access either to view the information, or to modify or alter the information.

Implementing secure file formats with entire file integrity has long been recognized as a requirement for data storage systems. In such systems, the inter-relationship of all records is generally maintained and encapsulated under a single file hash value, such as is discussed in U.S. Pat. No. 5,475,826 to Fischer, titled "Method for Protecting a Volatile File Using a Single Hash".

U.S. Pat. No. 5,504,892 to Taligent, Inc. is titled "Extensible Object-Oriented File System", and discloses an example of a system in which the hierarchical nature of object-oriented programming has been utilized to provide a framework for an extensible object-oriented file system with a file system entry class which is sub-classed into a volume, directory and file subclass. User authentication and protection domains are used to protect against unauthorized access to file system entities. User authentication is achieved by providing a local authentication service, and protection domains are implemented through a method of one of the file system entities. In order to provide interoperability with foreign file systems, a mechanism is disclosed for packaging a foreign file into a compatible format before transporting it to the system disclosed in the patent. The files are unpackaged into the format of the foreign file system when transported back to it.

U.S. Pat. No. 4,713,753 of Honeywell Inc., titled "Secure Data Processing System Architecture with Format Control", illustrates another data processing system architecture for the secure storage and processing of data using file format control and a protected file system. In this method, the protected systems files remain at all times within a secure processor, and user access to the files is provided as a function of a comparison between the formats associated with the files and the function of each file's attributes or the subsystem performing the requested operations.

European Patent Application No. EP66165 1-A1 discloses unification of a directory service with a file system service, and stores the directory entries and other files in a common logical format. This system allows a common set of tools to operate on both such entities and a common name space to be utilized. Security measures are taken to prevent unauthorized access to directory service entries.

Two IBM Technical Disclosure Bulletin publications, "Data Base Security/Authorization Mechanisms" (Vol. 28, No. 3, August 1985) and "Change-Notification Service for Shared Files" (Vol. 36, No. 8, August 1993), describe database security and authorization mechanisms including file maintenance utilities with file formats.

In electronic commerce applications, some financial data in the transaction may require encryption, other information may require data integrity (read-only access), and the entire transaction, or portions of it, may require a digital signature. The transaction may also contain addressing information in a plain text form to permit it to be interpreted by communications software. The entire transaction file cannot simply be encrypted to protect the most sensitive information, since this would transform the communication addressing information into a form that is unreadable to the communication software.

Encryption of only a portion of a file has previously only been implemented in a few types of files. For example, encryption algorithms are available which permit the encryption of certain cells in a spreadsheet. However, this technology is not available for a wide class of file formats or for files intended for electronic transmission. Also, the encryption of portions of files cannot be combined with other security requirements over the same or other portions of the files.

A simple electronic consumer purchase is an example of a transaction involving a single compound document requiring multiple security protections. Each transaction file may include multiple data fields, and each of the data fields may have a different security requirement than others in the same transaction. For example, data such as the credit card number and expiry date may require encryption, addressing information may require data integrity, and the entire transaction may require a digital signature.

Similarly, in a realty transaction, the buyer and seller usually negotiate on a standard form. Most of the information printed on the form does not require any form of security protection. However, the price will be confidential and may require encryption, particularly if the offer is to be transmitted over a non-secure network. Conditions attached to the offer may also require encryption, and because conditions may be deleted or expanded in a counter-offer, the encrypted information may not be of uniform size from one transmission to the next. In addition, any changes made by a party during the negotiation will have to be signed (initialed) by the party making the change.

Other types of commercial applications may include multiple files or documents resulting, for example, from having the electronic documentation for the transaction prepared by more than one person or emanating from more than one source. A typical commercial transaction with a government body could include the ultimate purchase order, as well as the background documents. Other examples of commercial transactions are the quotation, the invitation to quote, the tender and the invitation to tender, the invoice, and the acknowledgment.

Because the several documents relate to a single transaction, all of the files should be packaged together for transmission or storage. However, each file in the package may have its own security requirements, independent of the type of security required for other files used in the transaction, and therefore, there is a requirement to be able to wrap multiple files as a single entity having multiple security requirements for exchange or storage for these applications.

There are several utility programs currently available for packing multiple files into a single file for transmission or storage (eg., PKZIP on PC and tar on UNIX). There are also mechanisms that provide for data exchange between multiple file records, such as found in U.S. Pat. No. 5,021,995 of Wang Laboratories, Inc., titled "Data Exchange Apparatus and Methods", which discloses data exchange between file records with the production of a generic form for representing data that is used to mark fields in the source file logical record, and U.S. Pat. No. 5,522,066 of Industrial Technology Research Institute, titled "Interface for Accessing Multiple Records Stored in Different File System Formats", which discloses an interface for accessing multiple records stored in different file system formats. However, none of these provide a means for maintaining different security features associated with individual files or records once a number of files or records have been accessed or packed together.

SUMMARY OF THE INVENTION

It is an object of the present invention to provide a mechanism for packing several file components together, regardless of whether the components are portions of files, full files, documents or transactions, while accommodating diverse security requirements for those components.

It is also an object of the present invention to provide a packing mechanism that is independent of operating environment, and that can be used for all types of files.

Accordingly, the present invention provides a method for preparing a secure file packaging, that includes the steps of identifying file components to be packaged together, specifying security parameters for each file component, and specifying the security requirements for the secure file packaging. Then, for each file component, parameters for the security requirements are obtained, security functions associated with the security requirements are called and the component is processed. Parameters for the security requirements for the secure file packaging are also obtained and the security functions associated with those security requirements are called.

Preferably, when the security requirements for each file are specified, the required security protections and associated security algorithms are specified.

In another aspect, the invention provides a method for preparing a generic secure file wrapper that consists of selecting the file components to be packaged in the wrapper and reformatting the file components to provide a file body for each file component and at least one file containing file data. The file body contains pointers to file data and security protections, and preferably also a tag identifying the file component and length of the file. Also preferably, the security protections include security types and their associated algorithms in order to access file data that is secured.

The method also includes the steps of processing a file header for the wrapper identifying the beginning and length of the wrapper, and processing a file trailer providing security protection for the wrapper.

In a further aspect, the invention provides a wrapper for securing files for transmission or storage that includes a header for identifying the beginning and length of the wrapper, at least one file body containing pointers to file data, security specifications for the file data and output file specification parameters for accessing the file data, a trailer containing security specification for the wrapper, and a file containing the file data.

The present invention is also directed to a program storage device readable by a machine, tangibly embodying a program of instructions executable by the machine to perform the method steps described above.

BRIEF DESCRIPTION OF THE DRAWINGS

Embodiments of the invention will now be described in detail in association with the accompanying drawings, in which:

FIG. 1 is a schematic representation of a communications file, according to the prior art;

FIG. 7 shows an extracted address heading a GSFF file for the communication purpose.

DETAILED DESCRIPTION OF THE PREFERRED EMBODIMENTS

FIG. 1 illustrates the structure of a typical communications file used in an electronic transaction such as a tender to supply goods. The file includes multiple fields, and each field contains important information required for the transaction. Field 1 contains the address destination for the transmission. As discussed above, the address is generally formatted in plain text, so that it is readily understandable to any standard communications software that it encounters during, transmission over a network. However, the address field 1 may also be subject to an integrity check, prior to transmission, to ensure that the data describes a valid address.

Field 2 contains ordering information from the merchant, such as prices for set quantities. Because this information may include disco-ants available only to certain customers, it is likely that this field would be encrypted so that only the addressee has access to the information.

Fields 3, 4 and 5 may contain other information of a less confidential nature, such as delivery dates and other conditions of sale. Although this information may not be so sensitive as to require encryption, there may still be a need to employ other security measures to limit access to the addressee only, such as file hashing, etc.

Finally, field 6 contains the digital signature of the tendering party, required to be digitally "signed back" when the tender is accepted by the addressee.

The FIG. 1 tender document could be a single transaction file or it could be just one of a number of documents making up a larger transaction. If the FIG. 1 document relates, for example, to the provision of system software to run a proprietary manufacturing process, then the software specifications and even the source of the software may, themselves, be highly confidential pieces of information requiring the secure wrapping of the entire file, in addition to encryption of the price clause, when bundled together with other documents making up the transaction for transmission.

Figure 2:
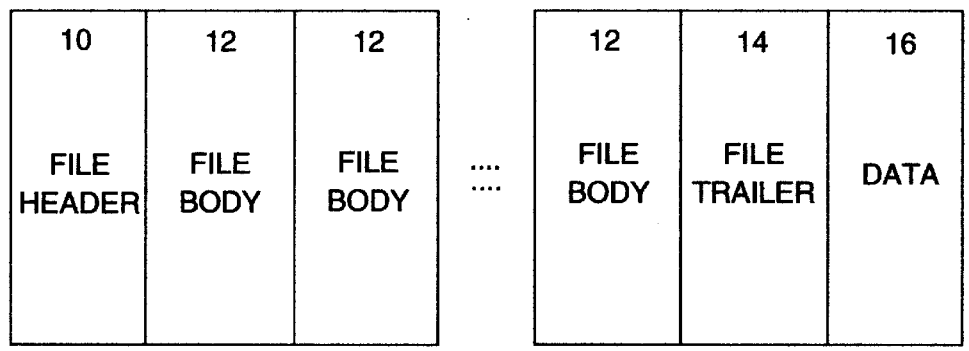
FIG. 2 is a schematic representation of a file structure, implemented according to the present invention.

Therefore, to address these differing security requirements, the present invention provides a generic secure file format (GSFF), one embodiment of which is illustrated in FIG. 2. This file format allows multiple files to be wrapped into a single entity for storage or interchange. Each file can have different security requirements from that of other files. Different file types can be interchanged under a single wrapper in this secure file format. The secure file format also allows one file to be divided into multiple sections and wraps the sections into a single file. Each section of the file has its own security protection. This enables only sensitive information to be protected and leaves other sections with less or no security protection. This results in higher performance since security related operations are only required for a small portion of the file.

The security features that the generic secure file format of the present invention supports include data confidentiality through encryption, data integrity through hashing, message digest, and message authentication code (MAC, defined as a ANSI standard), and digital signature.

As illustrated in FIG. 2, the generic secure file format contains a file header 10, followed by multiple file bodies generally denoted as 12, and a file trailer 14 followed by data 16. Each file body 12 can have different security requirements from that of other bodies implemented as described below. For instance, one file may require encryption, and another file may require data integrity protection only. Each file is wrapped according to its requirements, and described in a file body. A pointer to the data is included in the file body section and the data is placed after the file trailer.

The generic secure file format of the invention is a directory based file format. The file header, file bodies and file trailer are considered as directories within the wrapper. The file header contains a file identifier, a version number of the generic secure file format, and the length of the wrapper. Each file body contains entries associated with that file body. The file trailer can be used for security protection for whole wrapper.

Figure 3:
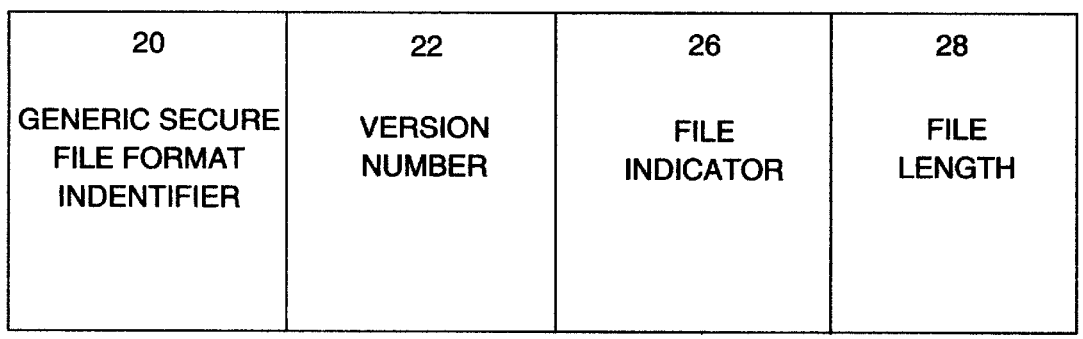
FIGS. 3, 4 and 5 are schematic representations, respectively, of the file header, file body and file trailer portions of the file structure illustrated in FIG. 2, according to the invention.

The structure of the file header is illustrated schematically in FIG. 3. The file header contains the generic secure file format identifier 20, a tag of a couple of bytes simply identifying the file format (eg., distinguishing between Intel and Motorola byte order), the version number 22 of the generic secure file format, the file indicator 24, and the length 26 of the entire file in the generic secure file format.

Figure 4:
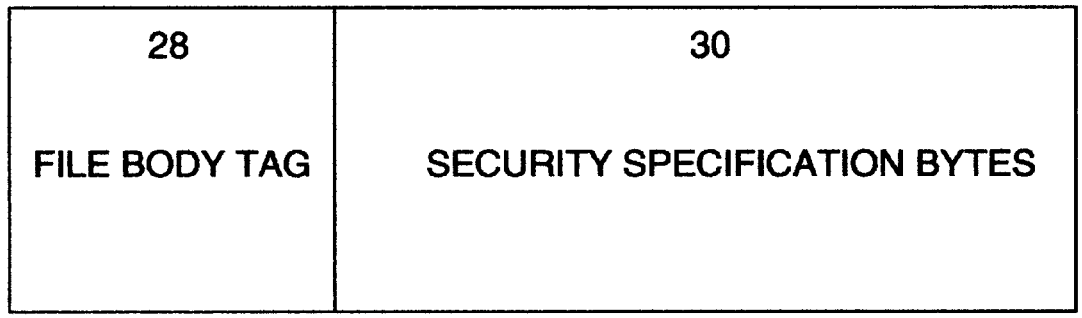

Each file body describes a file contained in the wrapper. As illustrated schematically in FIG. 4, the file body contains the file body tag 28 to identify the type of file as a body file and set out the file length, followed by the security specification 30. The security specification includes security type, security algorithms, security algorithm parameters, crypto-key information, operation mode, filter, character set, the output file specification parameters, data length, and a data pointer for the securely protected file data that follows the file trailer.

Figure 5:
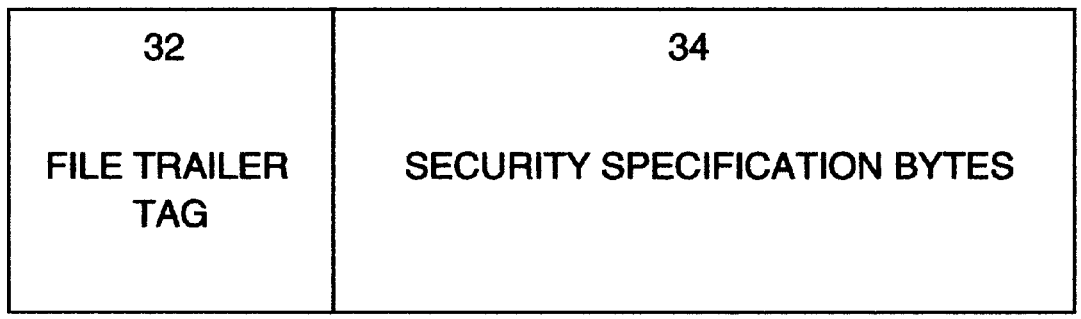

The file trailer, illustrated schematically in FIG. 5, contains a file trailer tag 32 to identify the file as the trailer and to specify the length of the trailer file. The trailer file also contains a section 34 setting out security specifications and parameters. The bytes containing the security specification specify security type, security algorithms, security algorithm parameters, crypto-key information, operation mode, filter, character set, and other security parameters.

Figure 6:
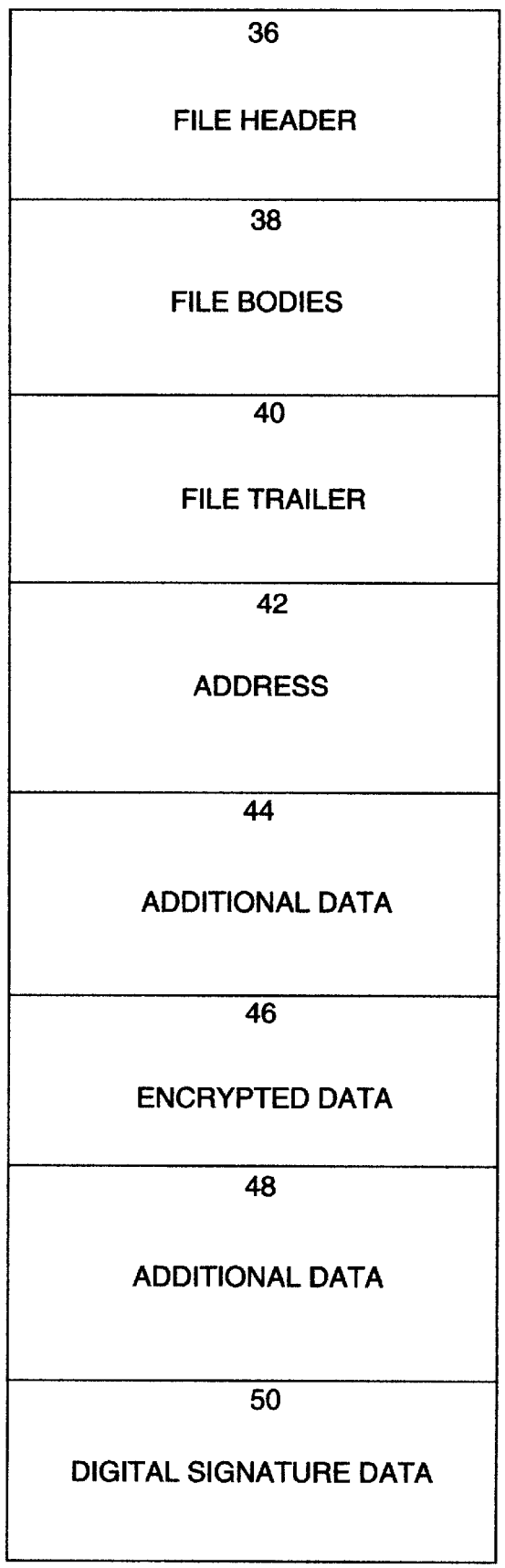
FIGS. 6, 8 and 9 are alternates to the file structure illustrated in FIG. 2, according to another aspect of the invention.

FIG. 6 schematically illustrates an alternate embodiment for transmission purposes of a generic secure file format, according to the invention. In this embodiment, an address 42 in a plain text form is the first data segment followed by additional data segments for additional data (44 and 48), encrypted data 46, and digital signature data 50. Since the lengths of the GSFF file header, file bodies, and file trailer are known, the address data can be immediately located and used for the communication purpose.

Figure 7:
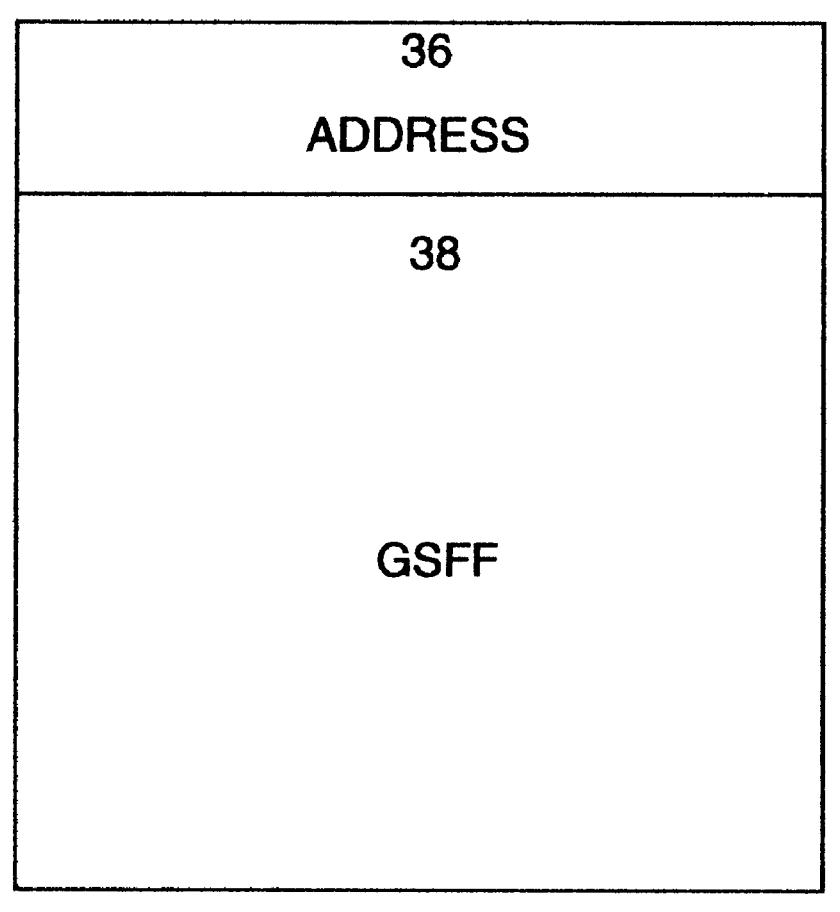

The address data also can be extracted from the GSFF file and used for communication in a format shown in FIG. 7, in which the an address 52 heads the wrapped file or collection of files. Both examples are useful for transmitting a number of documents with security requirements to a single address.

Figure 8:
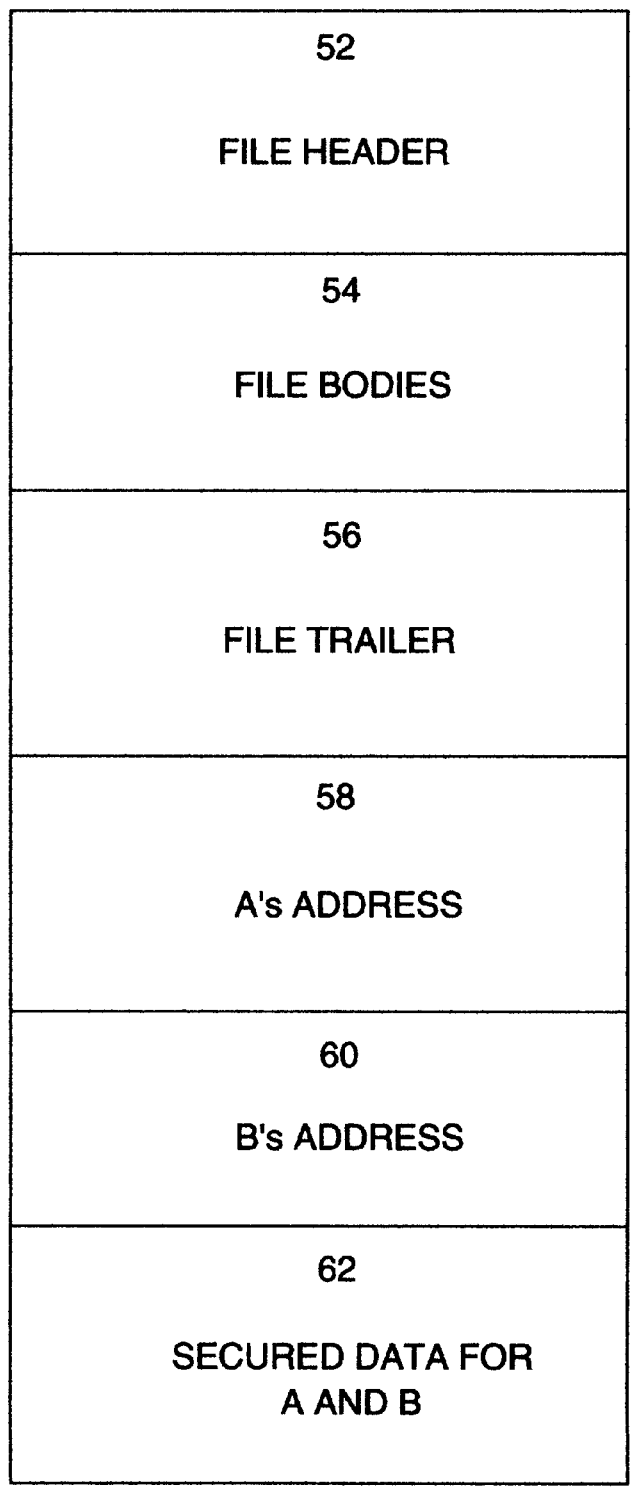
Figure 9:
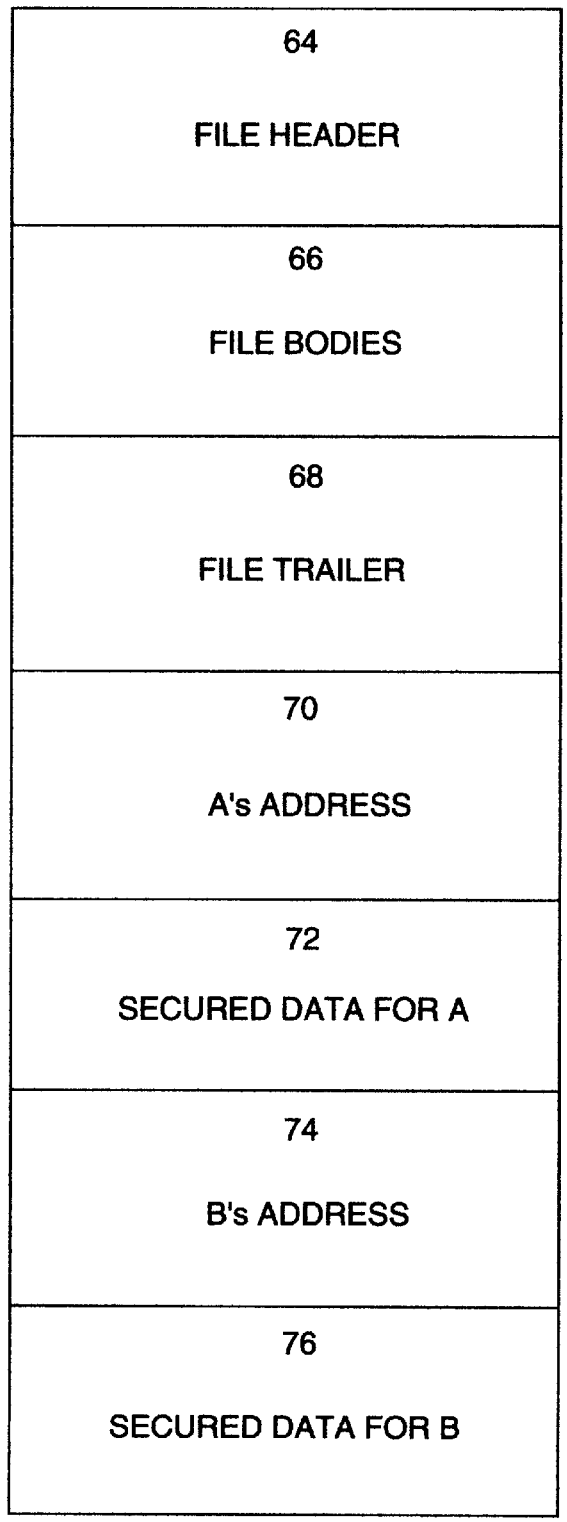

FIGS. 8 and 9 illustrate two alternative embodiments for transmitting data into multiple destinations. In FIG. 8, multiple address 58 and 60 are contained within a GSFF file as the first two data segments. The secure data segment 62 are to be sent to these two addresses. In FIG. 9, the GSFF file contains multiple data segments and multiple addresses. To each address, different data segment(s) will be sent.

For all cases presented in FIGS. 6, 7, 8, and 9, a communication software can easily locate, extract, or use address information without destroying data integrity property of the GSFF file for transmitting the secured data. Neither encryption nor digital signature verification is required for transmitting secured data contained in the GSFF file.

Figure 10:
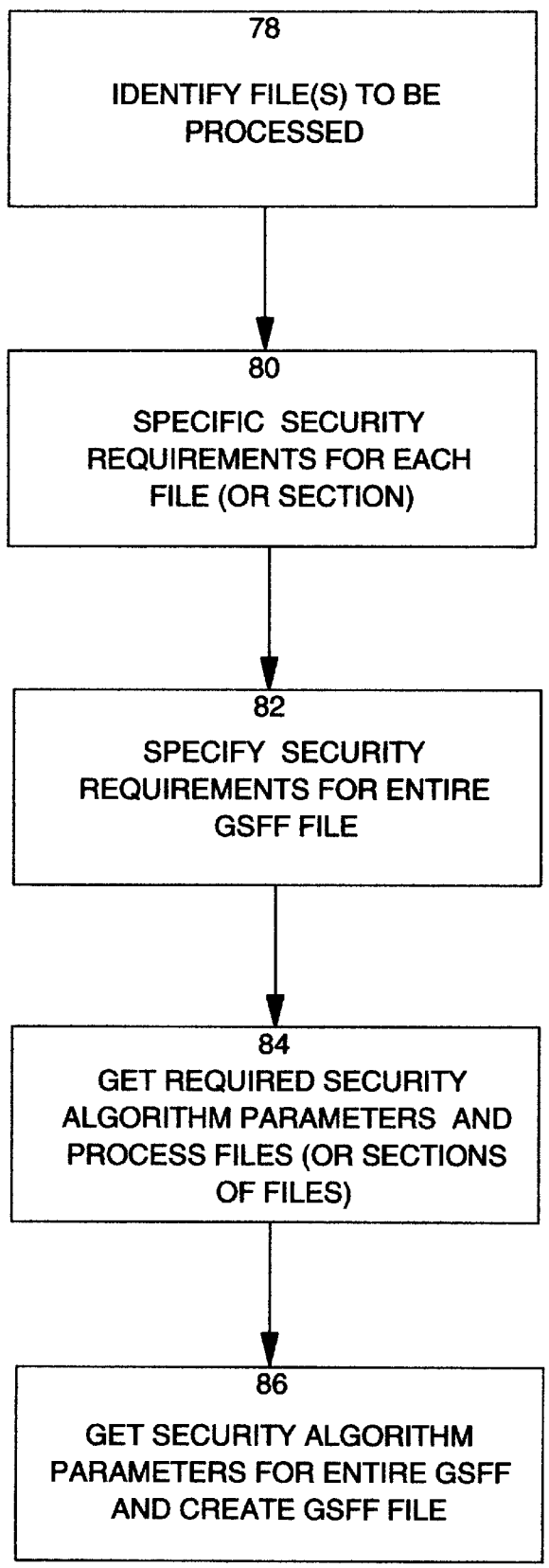
FIGS. 10 and 11 are flow diagrams illustrating the steps implemented to, respectively, wrap and unwrap a variety of files in a generic secure file format for transmission or storage, according to further aspects of the invention.
Figure 11:
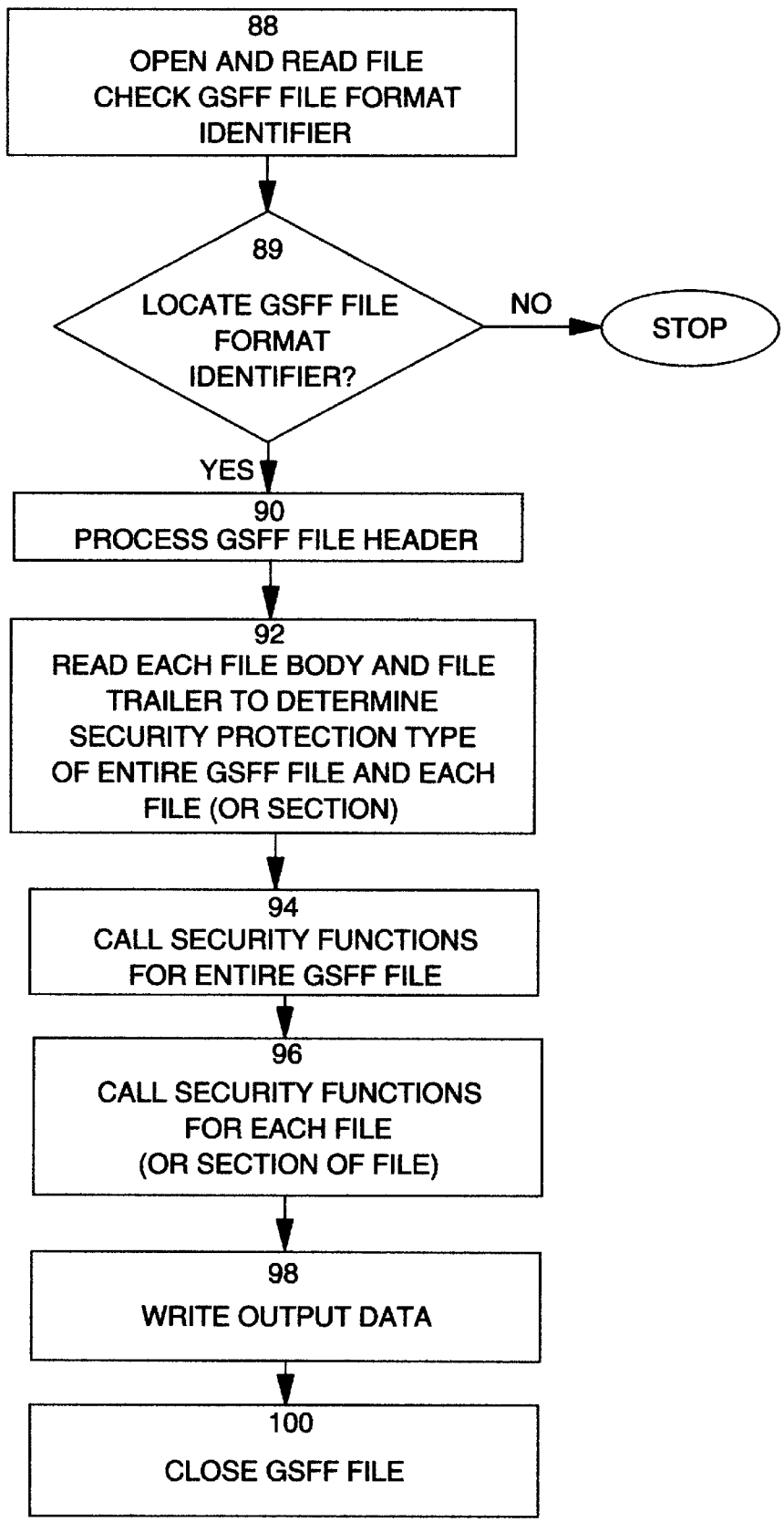

The present invention also provides methods for applying security against a variety of files, and these are illustrated in the flow diagrams of FIGS. 10 and 11.

FIG. 10 illustrates the steps of what might be referred to as "wrapping" a single compound file or a number of files in a generic secure file format (GSFF).

According to the preferred embodiment, the first step is to identify files (in the case of wrapping multiple files) or sections of a file (in the case of wrapping a single file) to be processed (block 78). The security requirements for each file (or section of a file) need to be specified (block 80). This step identifies what security protections are required for each file (or section of a file), the security algorithm for each security protection, the operation mode of the chosen algorithm if applied, filter requirements, the character set used, the output file name, and other information. Similarly, the security requirements for the entire GSFF file need to be specified (block 82). After identifying the security requirements, the parameters used for each security algorithm are obtained, and each file (or section of a file) is processed (block 84). After obtaining the parameters for the security algorithms required for the entire GSFF file, the associated security functions for each security algorithm are called, and the GSFF file is created (block 86).

FIG. 11 illustrates the steps involved in "unwrapping" a generic secure file format file on receipt. The "unwrapping" process starts by opening a file (block 88) and checking for the GSFF file identifier (block 89). If the file opened is a GSFF file, the process continues; otherwise, it stops. The GSFF file header is processed to determine the GSFF version, the file indicator, and file length (block 90). Each file body and the file trailer information is read in, and security protection type is determined for the entire GSFF file and for each file (or each section of a file) (block 92). The security functions are called for the entire GSFF file (block 94). One example of a security function is the digital verification function for the entire GSFF. Then, the security functions are called for each file (or for each section of a file) (block 96). The output data is written into multiple files in the case of multiple wrapped files, or to a single file in the case of a wrapped compound file (block 98). The GSFF file is closed and the "unwrapping" process is finished (block 100).

The solution proposed above is independent of operating environments and works for any file types, allowing users to encrypt and/or digitally sign a portion of a compound document, or a single file within a package of files. Each document/file is treated as an entity having multiple security requirements. Single files or collections of files wrapped in the generic secure file format (GSFF) can be freely exchanged among different operating environments.

Although preferred embodiments of the invention have been described, modifications apparent to those skilled in the art are intended to be covered by the scope of the appended claims.

What is claimed is:

1. A program storage device readable by a machine, tangibly embodying a program of instructions executable by the machine to perform method steps for preparing secure file packaging, said method steps comprising:

identifying file components to be packaged together;

specifying security requirements for each said file component;

specifying security requirements for the secure file packaging;

obtaining parameters for the security requirements for each said file component, calling security functions associated with the security requirements associated with each said file component, and processing each said file component;

obtaining parameters for the security requirements for the secure file packaging and calling security functions associated with the security requirements associated with the secure file packaging; and creating a securely packaged file, wherein said creating step further comprises the steps of:

formatting a file header for said securely packaged file, wherein said header identifies a beginning and a length of said securely packaged file;

reformatting said processed file components to provide (a) at least one data file containing said processed file components in said securely packaged file, wherein a portion of said data file is in a secured form and (b) a file body in said securely packaged file for each of said processed file components, wherein each of said file bodies contains a pointer to said processed file component within said data file and security protections for said processed file component; and formatting a file trailer for said securely packaged file, wherein said trailer provides security protection for said securely packaged file.

2. A program storage device readable by a machine, tangibly embodying a program of instructions executable by the machine to perform method steps for preparing a generic secure file wrapper, said method steps comprising:

selecting file components to be packaged in the wrapper;

reformatting the file components to provide (a) a file body for each said file component, wherein each of said file bodies contains a pointer to file data and security protections for said file data, and (b) at least one data file containing said file data, wherein a portion of said file data is in a secured form;

processing a file header for the wrapper identifying a beginning and a length of the wrapper; and processing a file trailer providing security protection for the wrapper.

3. A method for preparing secure file packaging, comprising the steps of:

identifying file components to be packaged together;

specifying security requirements for each said file component;

specifying security requirements for the secure file packaging;

obtaining parameters for the security requirements for each said file component, calling security functions associated with the security requirements associated with each said file component and processing each said file component;

obtaining parameters for the security requirements for the secure file packaging and calling security functions associated with the security requirements associated with the secure file packaging; and creating a securely packaged file, wherein said creating step further comprises the steps of:

formatting a file header for said securely packaged file, wherein said header identifies a beginning and a length of said securely packaged file;

reformatting said processed file components to provide (a) at least one data file containing said processed file components in said securely packaged file, wherein a portion of said data file is in a secured form and (b) a file body in said securely packaged file for each of said processed file components, wherein each of said file bodies contains a pointer to said processed file component within said data file and security protections for said processed file component; and formatting a file trailer for said securely packaged file, wherein said trailer provides security protection for said securely packaged file.

4. The method according to claim 3, wherein:

the step of specifying security requirements for each said file component comprises identifying security protections required for each said file component and identifying a security algorithm associated with said security protections; and the step of obtaining parameters for the security requirements for each said file component comprises obtaining parameters for the security algorithm.

5. The method according to claim 4, wherein the step of specifying the security requirements for each said file component further comprises specifying an operation mode of the security algorithm, a character set used and an output file name.

6. The method, according to claim 3, wherein the file components are individual files.

7. The method, according to claim 3, wherein the file components are sections of a compound file.

8. A method for preparing a generic secure file wrapper, comprising the steps of:

selecting file components to be packaged in the wrapper;

reformatting the file components to provide (a) a file body for each said file component, wherein each of said file bodies contains a pointer to file data and security protections for said file data, and (b) at least one data file containing said file data, wherein a portion of said file data is in a secured form;

processing a file header for the wrapper identifying a beginning and a length of the wrapper; and processing a file trailer providing security protection for the wrapper.

9. The method, according to claim 8, further comprising the step of processing the wrapper in the following order: (i) the file header; (ii) all of the file bodies; (iii) the file trailer; and (iv) said at least one data file.

10. The method according to claim 8, wherein each said file body further comprises a tag identifying the file component and setting out a length of the file body, and wherein the security protections comprise security types and security algorithms for said security types to access the file data in said secured form.

11. The method according to claim 8, wherein the file trailer contains a tag identifying a length of the trailer and security specifications and parameters for the wrapper.

12. The method, according to claim 8, wherein the file components are individual files.

13. The method, according to claim 8, wherein the file components are sections of a compound file.

14. A wrapper for securing files for transmission or storage, wherein said wrapper resides on a computer readable memory, said wrapper comprising:

a header for identifying a beginning and a length of the wrapper;

at least one data file resulting from reformatting processed file components, said data file comprised of a stored version of each of one or more said file components, wherein each of said stored versions is either a secure representation of said file component or a non-secure representation of said file component;

for each of said stored versions, a file body resulting from said reformatting, comprising: a pointer to a location in said data file, said location being where said stored version of said file component begins; security specifications for said stored version of said file component; and output file specification parameters for accessing the stored version of said file component; and a trailer containing security specifications for the wrapper.

15. The wrapper, according to claim 14, wherein at least some of the file data is secured by at least one of encryption, data integrity or digital signature.

16. The wrapper, according to claim 14, wherein the security specifications include security type, security algorithms, security algorithm parameters and operation modes for the security algorithms.

17. The wrapper, according to claim 14, further comprising address data in plain text form.

18. The wrapper, according to claim 17, wherein the address data is contained in at least one initial data segment in the data file.

19. The wrapper, according to claim 17, wherein the address data is located before the header.

* * * * *